(12) United States Patent
Shoa Hassani Lashdan

(10) Patent No.: US 8,811,735 B2
(45) Date of Patent: Aug. 19, 2014

(54) SYSTEM AND METHOD FOR SCALAR QUANTIZATION ERROR REDUCTION

(75) Inventor: Alireza Shoa Hassani Lashdan, Burlington (CA)

(73) Assignee: Sigma Designs, Inc., Milpitas, CA (US)

( * ) Notice: Subject to any disclaimer, the term of this patent is extended or adjusted under 35 U.S.C. 154(b) by 233 days.

(21) Appl. No.: 13/591,204

(22) Filed: Aug. 21, 2012

(65) Prior Publication Data

US 2014/0016865 A1   Jan. 16, 2014

Related U.S. Application Data

(60) Provisional application No. 61/671,683, filed on Jul. 14, 2012.

(51) Int. Cl.
*G06K 9/00* (2006.01)

(52) U.S. Cl.
USPC ........... 382/166; 382/235; 382/243; 382/251; 358/537; 358/463

(58) Field of Classification Search
USPC .......... 382/166, 235, 243, 251; 358/537, 538, 358/463
See application file for complete search history.

(56) References Cited

U.S. PATENT DOCUMENTS

| | | | |
|---|---|---|---|
| 7,382,925 B2* | 6/2008 | Boliek et al. | 382/233 |
| 7,657,110 B2* | 2/2010 | Feng et al. | 382/251 |
| 8,374,246 B2* | 2/2013 | Raveendran et al. | 375/240.16 |
| 8,401,315 B2* | 3/2013 | Demos | 382/232 |
| 8,655,092 B2* | 2/2014 | Li et al. | 382/251 |

* cited by examiner

*Primary Examiner* — Yosef Kassa
(74) *Attorney, Agent, or Firm* — Perkins Coie LLP; Aaron Wininger

(57) ABSTRACT

To reduce artifacts caused by quantization errors in image compression systems, an offset is added to quantized samples at low frequency sections of a macroblock. A decoder uses the offset after decoding to bring the decoded sample closer to the original pre-encoded and pre-quantized sample, thereby compensating for quantization errors.

16 Claims, 3 Drawing Sheets

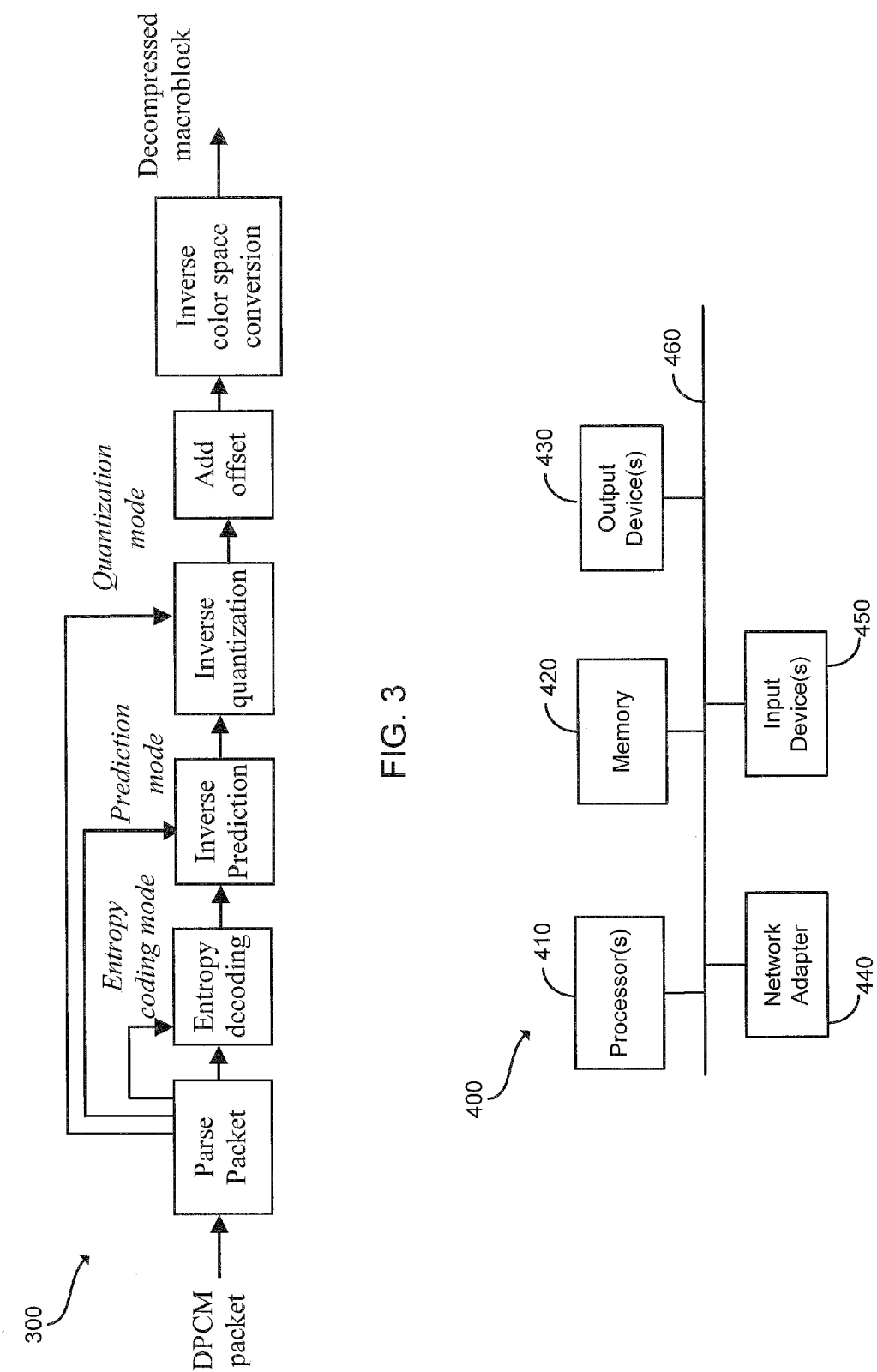

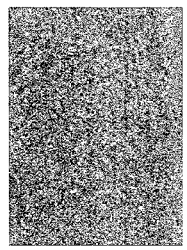 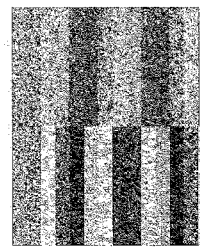
FIG. 5A
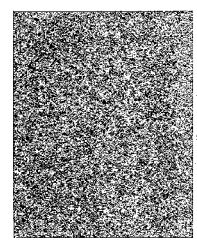 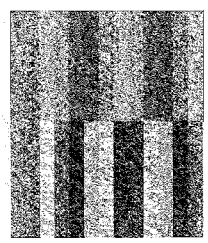
FIG. 5B
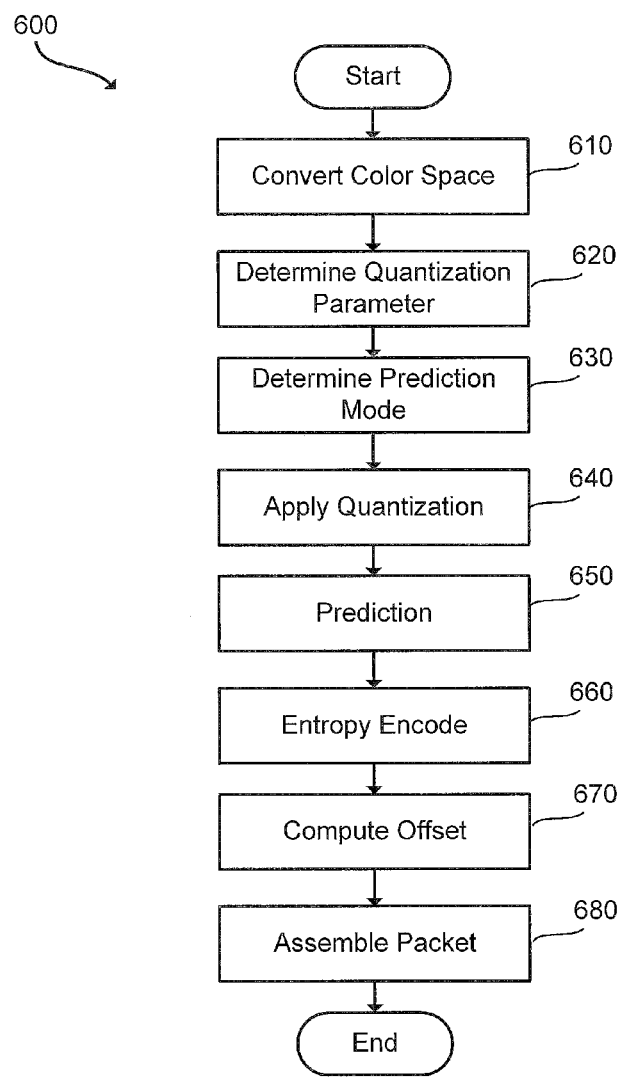
FIG. 6

SYSTEM AND METHOD FOR SCALAR QUANTIZATION ERROR REDUCTION

PRIORITY CLAIM

This application claims benefit of and incorporates by reference U.S. Patent Application No. 61/671,683 filed Jul. 14, 2012 entitled "Scalar Quantization Error Reduction by Adding an Offset" by Alireza Shoa Hassani Lashdan.

FIELD OF THE INVENTION

At least one embodiment of the present invention pertains to image compression, and more particularly but not exclusively, to a system and method for fixed rate image compression that reduces distortion from quantization errors.

BACKGROUND

Quantization is used in compression encoders in order to control output bit rate. Quantization maps a set of input data into a smaller set of quantized data that can be encoded using a lower bit rate. For example, in a quantizer quantized data may be found by:

$$Q(x,q)=(x>>3)$$

And quantization reconstruction values are found from the quantized values by:

$$Q^{-1}(x,q)=(x<<3)+4$$

For uniform distribution optimum reconstruction values are the centers of each quantization interval. While the optimum reconstruction values minimize the average distortion they can cause large quantization errors for input values that are close to quantization boundaries.

Accordingly, a new system and method are needed that reduce quantization errors.

SUMMARY

This summary is provided to introduce in a simplified form certain concepts that are further described in the Detailed Description below and the drawings. This summary is not intended to identify essential features of the claimed subject matter or to limit the scope of the claimed subject matter.

Embodiments of the invention provide an encoder, computer-readable medium, and method that can reduce the distortion caused by quantization error. In embodiments the quantization reconstruction values are adjusted in order to reduce the quantization error. Embodiments can be employed in a fixed rate image compression algorithm and can reduce the distortion and eliminate noticeable compression artifacts.

In an embodiment, the encoder comprises a quantization logic, an inverse quantization logic communicatively coupled to the quantization logic, an offset calculation logic communicatively coupled to the inverse quantization logic, and a packet builder. The quantization logic is configured to quantize a sample. The inverse quantization logic is configured to inverse quantize the quantized sample. The offset calculation logic is configured to receive the inverse quantized sample and neighboring inverse quantized samples and to generate, in a macroblock, an offset that can reduce the quantization error for the inverse quantized sample if neighboring inverse quantized samples (e.g., at least one or at least two) have a substantially same value as the inverse quantized sample The packet builder is configured to build a packet using the quantized sample and the generated offset.

In an embodiment, the method, which the computer-readable medium can store instructions to cause a computer to execute the method, comprises: quantizing a sample; inversing quantization of the quantized sample; receiving the inverse quantized sample and neighboring inverse quantized samples; generating, in a macroblock, an offset for the inverse quantized sample that reduces the quantization error if neighboring inverse quantized samples (e.g., at least one or at least two) have a substantially same value as the inverse quantized sample; and building a packet using the quantized sample and the generated offset.

In an embodiment, a decoder comprises an inverse quantization logic and an add offset logic communicatively coupled to the inverse quantization logic. The inverse quantization logic is configured to inverse quantize a quantized sample. The add offset logic is configured to add a received offset to the inverse quantized sample. The offset generated at the encoder for a macroblock if neighboring inverse quantized samples have a substantially similar value as the inverse quantized sample. The inverse quantized sample with received offset is substantially similar to an original sample before quantization.

Other aspects of the encoder, medium, and method will be apparent from the accompanying figures and detailed description.

BRIEF DESCRIPTION OF THE DRAWINGS

One or more embodiments of the present invention are illustrated by way of example and not limitation in the figures of the accompanying drawings, in which like references indicate similar elements.

FIG. 3 shows a decoder according to an embodiment of the invention.

FIG. 4 is a high-level extent diagram showing an example of the architecture of the decoder and/or encoder.

FIG. 5A and FIG. 5B showing an example of applying the quantization offset using the encoder and decoder of FIG. 2 and FIG. 3 respectively.

FIG. 6 illustrates a technique for reducing quantization error in image compression according to an embodiment of the invention.

DETAILED DESCRIPTION

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, such references are not necessarily mutually exclusive either.

Figure 1:
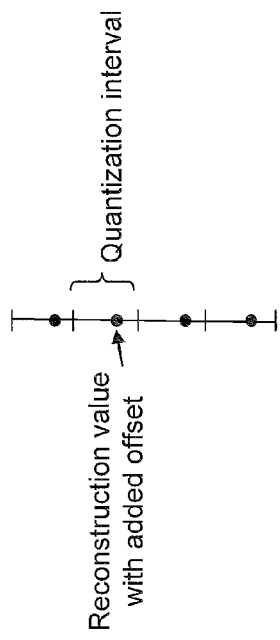
FIG. 1 shows quantization reconstructed values after a quantization offset.

FIG. 1 shows quantization reconstructed values after a quantization offset using an encoder 200 (FIG. 2) and a decoder 300 (FIG. 3) as will be discussed further below.

Figure 2:
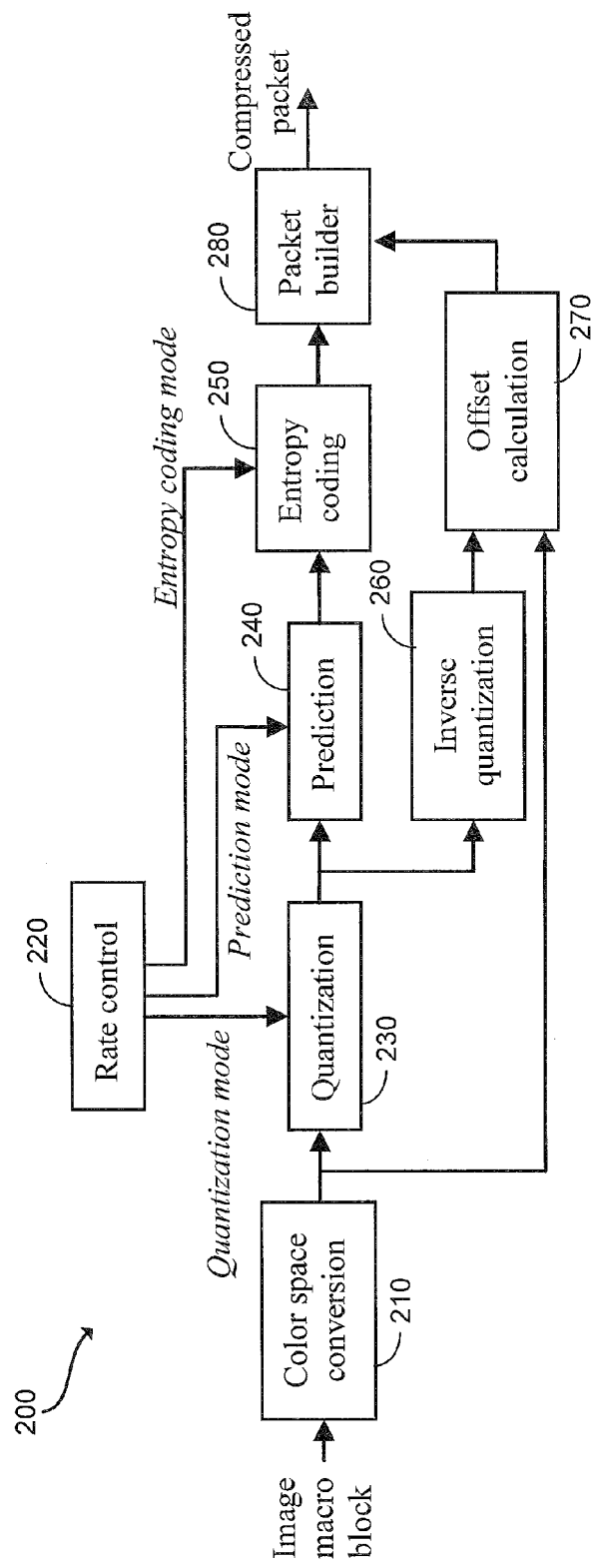
FIG. 2 shows an encoder according to an embodiment of the invention.

FIG. 2 shows the encoder 200 according to an embodiment of the invention that can generate the offset used in FIG. 1. The encoder 200 comprises color space conversion logic 210 communicatively coupled to quantization logic 230, which is communicatively coupled to both prediction logic 240 and inverse quantization logic 260. The prediction logic 240 is communicatively coupled to entropy coding logic 250, which is communicatively coupled to a packet builder 280. An offset calculation logic 270 is also communicatively coupled to the packet builder 280 and the inverse quantization logic 260. A rate control logic 220 is coupled to the quantization logic 230, the prediction logic 240, and the entropy coding logic 250.

In this encoder 200, a macroblock of, for example, size 2×32, luma and chroma components are compressed into a packet of size 768 bits resulting in a bit rate of 4 bits per component. If the input image sample format is 422 the chroma block size will be 2×16 and the output packet size will be set to 512 bits which results in 4 bits per component.

The color space conversion logic 210 converts input images that are in RGB color space into YCbCr format. The encoder 200 uses 4 bit coefficients while the decoder 300 uses 15 bit coefficients. The coefficient precision is designed to keep the size of the multipliers small while resulting in less than 1 count of rounding error.

The quantization logic 230 uses uniform scalar quantization. Multiple quantization step sizes (size of the quantization interval) are used and the rate control uses the smallest quantization step size that satisfies the bit count budget for each packet. For example, for 8 bit images quantization step sizes of 0, 1, 2, 4, 8 and 16 can be used. Quantization also includes a worst case quantization mode. In worst case mode the prediction logic 240 is turned off and input pixels are quantized to 4 or 3 bits and placed directly in a final compressed packet. This mode is only used when prediction is not efficient in compressing data and it ensures that there is a limit to compression distortion when prediction is not helpful. For example for 8 bit pixels that are truncated to 4 bits the distortion is always less than 8 and for 8 bit pixels that are truncated to 3 bits the distortion is always less than 16.

The prediction logic 240 comprises 3 horizontal prediction modes for the first line and 10 2D prediction modes for the second line. An inter color prediction mode is designed that predicts Cb from Y and Cr from Cb. The prediction logic 240 subtracts the prediction from the quantized samples and calculates the prediction error. For each macroblock a prediction mode for each line and for each color component is found by the rate control 220. The 3 horizontal prediction modes include the previous pixel and a linear combination of the two previous pixels. The third mode is no prediction which sets the prediction to zero. For the second line the predictions include the top pixel, top left pixel, top right pixel, bottom left pixel, top second left pixel, top second right pixel, a linear combination of the top, top left and left pixels, the average of the top and the top right pixels and the average of the top and the top left pixels. There is also a no prediction mode in which the prediction is set to zero. In the inter-color prediction mode each sample is predicted from the sample that corresponds to the same location but belongs to a different color component by multiplying the sample by a ratio calculated by the rate control block.

The entropy coding logic 250 comprises two modes: Exp-Golomb coding and a fixed length coding. The fixed length coding is used only when prediction mode is set to "no prediction" and variable length coding is inefficient. Otherwise Exp-Golomb coding is used. The entropy coding logic 250 encodes the prediction errors found by the prediction logic 240.

The rate control logic 220 finds the prediction mode and the quantization parameter that result in minimum distortion. Each quantization parameter corresponds to a different quantization step size (i.e. the size of each quantization interval in FIG. 1). Larger quantization parameters correspond to larger quantization intervals which means more quantization. The rate control logic 220 also determines the entropy coding to use. If no combination of prediction mode and quantization parameters result in a bit count that is smaller than the bit count budget for each packet the worst case quantization mode will be used and prediction will be turned off. Finally the offset calculation logic 270 finds the quantization offset that is added to the quantization reconstruction values in order to reduce the quantization error.

The packet builder logic 280 generates the header of the packet which includes the quantization parameter, prediction modes, entropy coding modes and offset values. It also places the encoded prediction errors into the packet and adds the necessary padding bits to generate 768 bit packets for each macroblock of size 2×32 luma and chroma (444 sample format) or 512 bit packets for macroblocks of size 2×32 luma and 2×16 chroma samples (422 sample format).

In this image compression encoder 200 each macroblock is encoded independent of other macroblocks. The quantization, prediction and entropy coding modes will be different for different macroblocks and therefore the encoder 200 adapts to local properties of the image. Due to the high output bit rate (4 bits per component) and the number of prediction and entropy coding modes the encoder 200 can achieve visually lossless performance meaning that no noticeable artifacts will occur for natural images and standard test patterns. Since the macroblock height is small and is set to 2 lines this encoder is an ideal choice when low latency is required while no visible compression artifacts are accepted. The fixed bit rate is also a desired feature for many practical applications that require random access or constant bit rate.

Quantization is used in this encoder 200 to control the bit rate and achieve a fixed bit rate for all macroblocks. In general higher quantization parameters are selected for macroblocks that contain higher frequency components and more detail and texture. However, quantization error in high frequency areas of an image are less noticeable and therefore visually lossless performance can be achieved in these areas. Since prediction is very effective in compressing low frequency areas low quantization parameters will be used for these areas and therefore no visible artifacts will be seen on low frequency areas. Note that high variations in pixel values correspond to high frequency components in frequency domain representation of the image signal. If pixel values are close together or change more gradually this will correspond to lower frequency components. The compression encoder 200 does not need to distinguish between low frequency and high frequency macroblocks. Since encoding is based on predictive coding it performs better (uses less quantization) when pixel values are more predictable, i.e., are close to their neighboring pixels. Therefore in general it uses lower quantization when the macroblock does not contain a lot of high frequencies and it uses larger quantization values when there is many high frequency variations in pixel values and pixels are less predictable.

Some macroblocks contain both low frequency and high frequency areas. If prediction cannot extract the correlations between samples, these macroblocks may be quantized by large quantization parameters. While large quantization errors in high frequency areas are generally difficult to notice, the quantization errors on low frequency areas can cause visible artifacts. The offset computation logic 270 provides a quantization error reduction feature and reduces the effect of quantization noise in low frequency areas in order to minimize the visible artifacts. This is done by adjusting the quantization reconstruction level for low frequency areas such that the decompressed samples are closer to the original samples. A quantization offset is computed at the encoder 200 for low frequency areas and will be added to the reconstructed samples at the decoder 300. This will move the reconstruction level for decoded samples and put the reconstruction levels closer to the original samples. Thus, even if large quantization parameters are used the reconstruction levels are placed as close as possible to the original samples in order to reduce the quantization error.

An example of this is macroblocks that contain a plain background as well as high frequency objects and every pixel in the background has a similar value. When the macroblock is quantized, quantization errors in the background appear like edges and can cause noticeable artifacts. This is more noticeable when large quantization parameters are used and quantization errors are large. However, if the quantization reconstruction value is close to the value of the background pixels, the quantization error will be small even if large quantization parameters are used. The quantization offset ensures that the quantization reconstruction values are placed closer to the original sample values and therefore reduces the quantization error. This is shown in FIGS. 5A and B. As can be seen in this figure applying quantization offset reduces the quantization error for the gray area by moving the quantization reconstruction values closer to the actual value of the pixels in the gray areas.

The offset is more useful when many pixels in the macroblock have the same values after quantization (background pixels). If many pixels have the same value the offset can move the quantization reconstruction value closer to the value of the pixels that have similar quantized value and reduce the quantization error for these pixels. For other pixels in the macroblock for most cases it is better not to add any offset and use the original reconstruction values. Therefore, the offset is calculated only for the samples in the macroblock that have similar values with their neighbors after quantization. The offset calculation logic 270 checks to see if the samples have similar neighbors before computing the offset. Per the equations below if the pixel has the same value as two of its three neighboring pixels it gets the quantization offset otherwise quantization offset is not used for this pixel. For pixels in the first line of the macroblock only the bottom, left and right pixels are used as neighboring pixels and for pixels in the second line pixels from the top, left and right side are used as neighboring pixels. First the values of $b_{i,j}$ are found for every pixel in the macroblock:

```
b_{i,j} = 0
if j = 0
    if i = 0
        if (Q^{-1}(Q(x_{i,j},q),q) = Q^{-1}(Q(x_{i,j+1},q),q)) or
           (Q^{-1}(Q(x_{i,j},q),q) = Q^{-1}(Q(x_{i+1,j},q),q))
            b_{i,j} = 1
        end
    end
    if i = 1
        if (Q^{-1}(Q(x_{i,j},q),q) = Q^{-1}(Q(x_{i,j+1},q),q)) or
           (Q^{-1}(Q(x_{i,j},q),q) = Q^{-1}(Q(x_{i-1,j},q),q))
            b_{i,j} = 1
        end
    end
end
if j = L - 1
    if i = 0
        if (Q^{-1}(Q(x_{i,j},q),q) = Q^{-1}(Q(x_{i,j-1},q),q)) or
           (Q^{-1}(Q(x_{i,j},q),q) = Q^{-1}(Q(x_{i+1,j},q),q))
            b_{i,j} = 1
        end
    end
    if i = 1
        if (Q^{-1}(Q(x_{i,j},q),q) = Q^{-1}(Q(x_{i,j-1},q),q)) or
           (Q^{-1}(Q(x_{i,j},q),q) = Q^{-1}(Q(x_{i-1,j},q),q))
            b_{i,j} = 1
        end
```

-continued

```
    end
end
if (j ≠ 0) and (j ≠ L - 1)
    c = 0
    if (Q^{-1}(Q(x_{i,j},q),q) = Q^{-1}(Q(x_{i,j+1},q),q))
        c = c + 1
    end
    if (Q^{-1}(Q(x_{i,j},q),q) = Q^{-1}(Q(x_{i,j-1},q),q))
        c = c + 1
    end
    if i = 0
        if (Q^{-1}(Q(x_{i,j},q),q) = Q^{-1}(Q(x_{i+1,j},q),q))
            c = c + 1
        end
    end
    if i = 1
        if (Q^{-1}(Q(x_{i,j},q),q) = Q^{-1}(Q(x_{i-1,j},q),q))
            c = c + 1
        end
    end
    if (c ≥ 2)
        b_{i,j} = 1
    end
end
```

In the above equations $x_{i,j}$ are the original sample values after color space conversion and L=32 is the length of the macroblock, q is the quantization parameter. Quantization is defined by:

$$Q(x,q) = \text{sign}(x) \times (|x| >> q)$$

Inverse quantization is calculated by the inverse quantization logic 260 and defined by:

$$Q^{-1}(x, q) = \text{sign}(x) \times ((x << q) + \text{bias})$$

$$\text{bias} = \begin{cases} 0 & q = 0 \\ 1 << (q - 1) & \text{otherwise} \end{cases}$$

If $b_{i,j}$=1 the sample is considered to be part of the background and an offset value can be applied to this sample. In order to find the optimum offset, the following 5 distortion values are computed by the offset calculation logic 270 for each component:

$$d_0^b = \sum_{i=0}^{1} \sum_{j=0}^{L-1} |x_{ij} - Q^{-1}(Q(x_{ij}, q), q)| \times b_{i,j}$$

$$d_0 = \sum_{i=0}^{1} \sum_{j=0}^{L-1} |x_{ij} - Q^{-1}(Q(x_{ij}, q), q)|$$

$$d_1^b = \begin{cases} d_0^b & q \le 1 \\ \sum_{i=0}^{1} \sum_{j=0}^{L-1} |x_{ij} - (Q^{-1}(Q(x_{ij}, q), q) + (1 << (q - 2)))| \times b_{i,j} & q > 1 \end{cases}$$

$$d_2^b = \begin{cases} d_0^b & q \le 1 \\ \sum_{i=0}^{1} \sum_{j=0}^{L-1} |x_{ij} - (Q^{-1}(Q(x_{ij}, q), q) - (1 << (q - 1)))| \times b_{i,j} & q > 1 \end{cases}$$

-continued $$d_3 = \begin{cases} d_0 & q = 0 \\ \sum_{i=0}^{1} \sum_{j=0}^{L-1} |x_{ij} - (Q^{-1}(Q(x_{ij}, q), q) - (1 << (q-1)))| & q > 0, \end{cases}$$

where $x_{i,j}$ is the original sample value after color space conversion and q is the quantization parameter.

The offset calculation logic 270 calculates the quantization offset by:

$d_{min} = d_0^b$
offset = 0
for k = 1 : 2
  if ($d_k^b < d_{min}$)
    offset = k
    $d_{min} = d_k^b$
  end
end
if ($2 \times d_3 < d_0$)
  offset = 3
end The above operations are done for all components and three offset indexes (offset$^Y$, offset$^{cb}$, offset$^{Cr}$) are computed. These offset values are placed in the header of each packet by the packet builder 280. An add offset logic of the decoder 300 finds the value of the offset from the offset indexes and adds the offset to the decoded values:

$$x_{i,j} = \begin{cases} x_{i,j} & \text{offset} = 0 \\ x_{i,j} + (1 << (q-2)) \times b_{i,j} & \text{offset} = 1 \\ x_{i,j} - (1 << (q-1)) \times b_{i,j} & \text{offset} = 2 \\ x_{i,j} - (1 << (q-2)) & \text{offset} = 3 \end{cases}$$

$x_{i,j} = \text{clip}(x_{i,j}, 0, 2^{BitDepth} - 1) = \min(\max(x_{i,j}, 0), 2^{BitDepth} - 1)$ In the above equations $d_0^b$ is the distortion for the pixels that are considered to be part of the background and may be modified by the quantization offset when no quantization offset is used. $d_1^b$ and $d_2^b$ are the distortions for these pixels if the offset of $1<<(q-2)$ or $-1<<(q-1)$ are used respectively. If any of these offset values result in a lower distortion than $d_0^b$ that offset will be used and offset will be set to offset=1 or offset=2 respectively; otherwise offset=0 is used. When offset=0 no offset is added to the decompressed samples which is the most likely case. When offset=1 or 2, the offset value is added to samples which are equal to at least two of their neighboring samples except for the boundaries of the macroblock in which only one of the two available neighbors needs to have the same value. These offsets are useful when the macroblock contains a plain background and high frequency objects and the macroblock is quantized by a high quantization parameter. The offset can reduce the error in the background without having any effect on the higher frequency objects in the macroblock.

$d_0$ is the distortion for all pixels in the macroblock without a quantization offset and $d_3$ is the distortion if an offset of $-1<<(q-1)$ is applied to all pixels in the macroblock. If $2 \times d_3 < d_0$ this offset value is used and we set offset=3. When offset=3, the offset is added to all samples in the macroblock. This mode is designed to improve the performance of multi generation compression. When an image is compressed, decompressed and compressed again it is likely that some macroblocks are quantized by a smaller quantization parameter in the second compression than the quantization parameter used in the first compression. Although the same quantization parameter used in the first compression can meet the bit rate budget and should ideally be selected by the second compression, it is likely that a smaller quantization parameter meets the bit rate budget as well and therefore is selected in the second compression. Since the inverse quantization function adds a bias that depends on the quantization parameter, if a different quantization parameter is used, the second compression will be lossy. The error will be equal to the bias added by inverse quantization which is not random and can add a dc error seen as color or brightness change in the decompressed macroblock. When offset=3 the bias is removed which is almost equivalent to quantization by a larger quantization parameter (the one used in the first compression).

Note that any offset value that results in noticeable improvement in picture quality can be used. The above offset values and the way they are selected are designed for the encoder 200 and 300 since they reduce most of the noticeable artifacts without adding too much to the complexity of the encoder. But in general other offset values can also be used.

FIG. 3 shows the decoder 300 according to an embodiment of the invention. As the decoder 300 is substantially the inverse of the encoder 200, the decoder 300 will not be discussed in further detail.

The encoder 200 and/or the decoder 300 can be implemented with architecture 400 shown in FIG. 4. The architecture 400 includes one or more processors 410 and memory 420 coupled to an interconnect 460. The interconnect 460 shown in FIG. 4 is an abstraction that represents any one or more separate physical buses, point-to-point connections, or both, connected by appropriate bridges, adapters, or controllers. The interconnect 460, therefore, may include, for example, a system bus, a form of Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire", and/or any other suitable form of physical connection.

The processor(s) 410 is/are the central processing unit (CPU) of the architecture 400 and, thus, control the overall operation of the architecture 400. In certain embodiments, the processor(s) 410 accomplish this by executing software or firmware stored in memory 420. The processor(s) 410 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 420 is or includes the main memory of the architecture 400. The memory 420 represents any form of random access memory (RAM), read-only memory (ROM), flash memory, or the like, or a combination of such devices. In use, the memory 420 may contain, among other things, software or firmware code for use in implementing at least some of the embodiments of the invention introduced herein.

Also connected to the processor(s) 410 through the interconnect 460 is a communications interface 440, such as, but not limited to, a network adapter, one or more output device(s) 430 and one or more input device(s) 450. The network adapter 240 provides the architecture 200 with the ability to communicate with remote devices and may be, for example, an Ethernet adapter or Fibre Channel adapter. The input device 450 may include a touch screen, keyboard, and/or mouse, etc. The output device 430 may include a screen and/or speakers, etc.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

FIG. 6 illustrates a technique 600 for reducing quantization error in image compression according to an embodiment of the invention. In an embodiment, the encoder 200 performs the technique 600 and the decoder 300 performs an inverse of the technique 600. First, if needed, the color space conversion logic 210 converts (610) input images that are in RGB color space into YCbCr format.

Next, the rate control logic 220 determines (620, 630) the quantization parameter and prediction mode that yields minimal distortion and whether the worst case quantization mode needs to be used or not. Quantization and prediction are then applied (640, 650). After, the resulting data are entropy encoded (660) by the entropy coding logic 250 using an entropy coding mode determined by the rate control 220. An offset is then calculated (670) by the offset calculation logic 270 and the packet is assembled (680) by the packet builder. The method 600 then ends.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. An encoder, comprising:
a quantization logic configured to quantize a sample;
an inverse quantization logic, communicatively coupled to the quantization logic, configured to inverse quantization of the quantized sample;
an offset calculation logic, communicatively coupled to the inverse quantization logic, configured to
receive the inverse quantized sample and neighboring inverse quantized samples; and
generate, in a macroblock, an offset for the inverse quantized sample if at least one of the neighboring inverse quantized samples have a substantially same value as the inverse quantized sample; and
a packet builder, communicatively coupled to the offset calculation logic, configured to build a packet using the quantized sample and the generated offset.

2. The encoder of claim 1, further comprising:
a prediction logic, communicatively coupled to the quantization logic, configured to find a prediction error for the quantized sample; and
an entropy encoding logic, communicatively coupled to the prediction logic and the packet builder; configured to entropy encode the prediction error for the quantized samples, wherein the packet builder is configured to build a packet using the generated offset values and the entropy coded prediction errors.

3. The encoder of claim 2, further comprising a rate control logic, communicatively coupled to the quantization logic, the prediction logic, and the entropy coding logic, configured to set a quantization parameter, a prediction mode and an entropy coding mode such that the resulting compressed bit count is less than a bit count budget for each packet,
wherein the packet builder is further configured to build a packet using the quantization parameter, the prediction mode, and the entropy coding mode.

4. The encoder of claim 1, further comprising a color space conversion logic, communicatively coupled to the quantization logic and the offset calculation logic, configured to convert a received sample from RGB format to YCBCr format before quantization.

5. The encoder of claim 4, wherein the offset calculation logic is further configured to generate offsets for each color component in a macroblock.

6. The encoder of claim 1, wherein the offset calculation logic calculates distortion values as a function of quantized samples, unquantized samples, and inverse quantized samples.

7. The encoder of claim 6, wherein the offset calculation logic generates the offset as a function of the calculated distortion values.

8. A non-transitory computer-readable medium having stored thereon instructions to cause a computer to execute a method, the method comprising:
quantizing a sample;
inversing quantization of the quantized sample;
receiving the inverse quantized sample and neighboring inverse quantized samples; and
generating, in a macroblock, an offset for the inverse quantized sample if at least one of the neighboring inverse quantized samples have a substantially same value as the inverse quantized sample; and
building a packet using the quantized sample and the generated offset.

9. A method, comprising:
quantizing, using a quantization logic, a sample;
inversing quantization of the quantized sample using an inverse quantization logic communicatively coupled to the quantization logic;

receiving the inverse quantized sample and neighboring inverse quantized samples using an offset calculation logic communicatively coupled to the inverse quantization logic; and generating, using the offset calculation logic, an offset for the inverse quantized sample if at least one of the neighboring inverse quantized samples have a substantially same value as the inverse quantized sample; and building, using a packet builder communicatively coupled to the offset calculation logic, a packet using the quantized sample and the generated offset.

10. The method of claim 9, further comprising:

finding prediction errors for the quantized sample using a prediction logic communicatively coupled to the quantization logic; and entropy encoding the prediction errors for the quantized samples using an entropy encoding logic communicatively coupled to the prediction logic and the packet builder; wherein the building builds a packet using the prediction errors after the prediction errors are entropy encoded.

11. The method of claim 10, further comprising setting, with a rate control logic, a quantization mode, a prediction mode and an entropy coding that are selected such that the resulting compressed bit count is less than a bit count budget for each packet.

12. The method of claim 9, further comprising converting a received sample from RGB format to YCBCr format before quantization using a color space conversion logic, communicatively coupled to the quantization logic and the offset calculation logic.

13. The method of claim 12, wherein the generating includes generating offsets for each color component in a macroblock.

14. The method of claim 9, further comprising calculating, with the offset calculation logic, distortion values as a function of quantized samples, unquantized samples, and inverse quantized samples.

15. The method of claim 14, wherein the generating generates the offset as a function of the calculated distortion values.

16. A decoder, comprising:

an inverse quantization logic, configured to inverse quantize a quantized sample;

an add offset logic, communicatively coupled to the inverse quantization logic, configured to add a received offset to the inverse quantized sample, the offset generated at an encoder for a macroblock if neighboring inverse quantized samples have a substantially similar value as the inverse quantized sample, wherein the inverse quantized sample with received offset is substantially similar to an original sample before quantization.

* * * * *